Patented Mar. 10, 1931

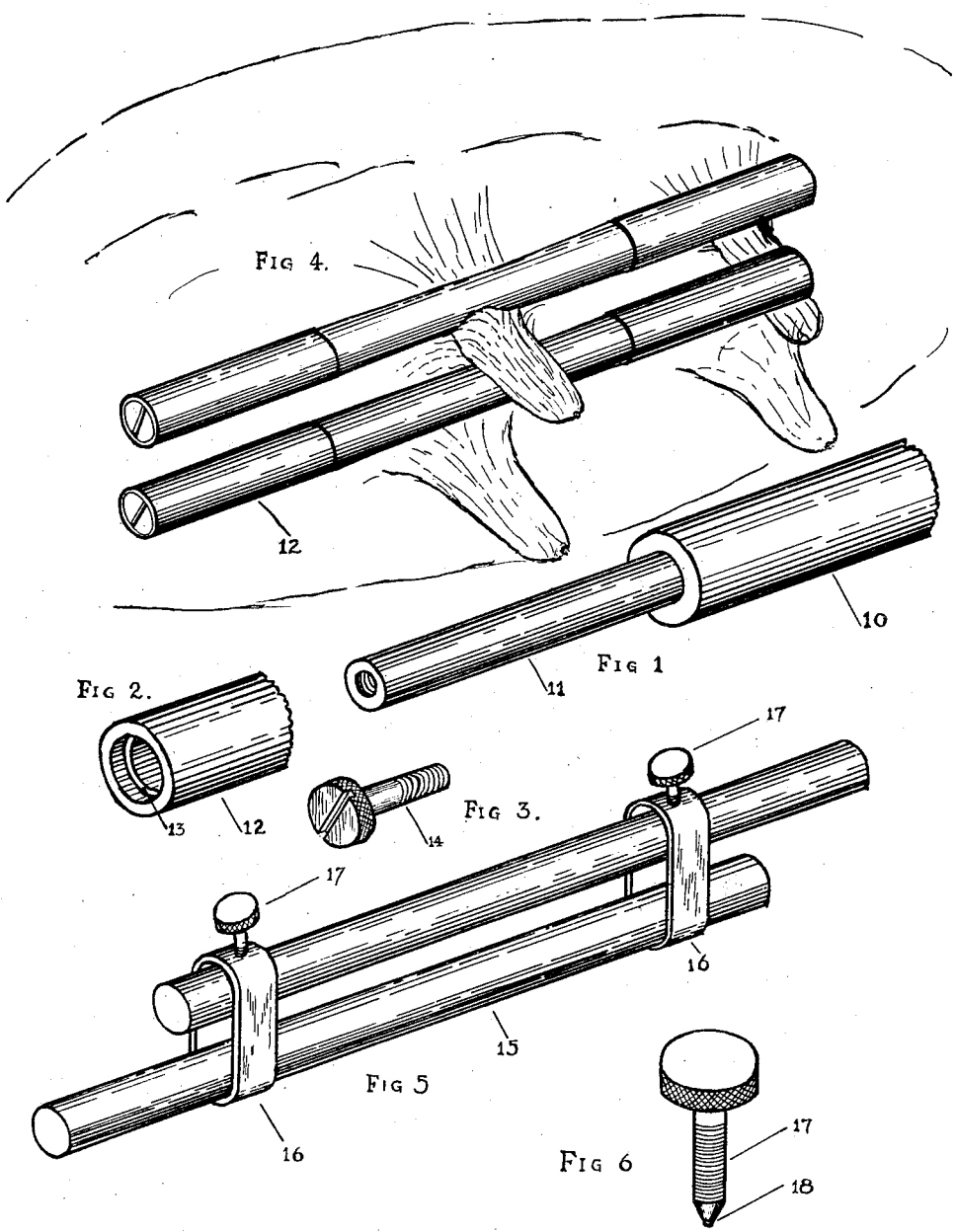

1,795,580

UNITED STATES PATENT OFFICE

DARRELL E. TRUMP, OF UTICA, NEBRASKA, ASSIGNOR TO NORDEN LABORATORIES, OF LINCOLN, NEBRASKA, A CORPORATION OF NEBRASKA

TEAT-TUMOR REMOVER

Application filed August 24, 1929. Serial No. 388,089.

My invention relates to veterinary instruments and more particularly to instruments of the kind designed to remove tumors and other obstructions in the teats of milch cows and of other milch animals.

The primary object of my invention is the provision of a simple instrument which will effectively remove obstructions from the teats without danger of injury to the animal.

Another of my objects is the provision of a teat tumor remover for external application so that no irritation results to the internal tissues as when probes and similar instruments are used.

Still another object which I have in view is the provision of an instrument of such a nature that very little skill or experience is required for its use.

Having in view these objects and others which will be pointed out in the following description, I will now refer to the drawings, in which Figure 1 is a view in perspective of the central or main portion of one member of my teat tumor remover.

Figure 2 is a view in perspective of a portion of the collar which serves as a handle.

Figure 3 is a perspective view of the screw which holds the handle member of Figure 2 on the body portions shown in Figure 1.

Figure 4 is an illustration showing the cow's udder and showing the manner in which the teat tumor remover is used.

Figure 5 is a perspective view of a modified form of the teat tumor remover.

Figure 6 is an illustration showing the form of screw used in the Figure 5 form of teat tumor remover.

The instrument consists of a pair of identical members preferably formed from metal. Each member consists of a central portion 10 having a shank 11 at each end for loosely receiving a collar 12. The collar 12 is provided with a shoulder 13, the length of the collar 12 from its inner end to its shoulder 13 being substantially equal to the length of the shank 11. The end of the shank 11 is internally screw threaded as shown in Figure 1 for receiving a screw 14. The distance between the shoulder 13 and the outer end of the collar 12 is substantially equal to the thickness of the head of the screw 14 and the inside diameter of the outer end of the collar 12 is very slightly in excess of the diameter of the head of the screw 14. The collars 12 are sufficiently loose on the shanks 11 so that the collars 12 can be firmly gripped by the hands to roll the main or body portion 10. The external diameters of the parts 10 and 12 are equal so that no ridges occur at the joints which might injure the animal. When assembled, the ends of the parts 10 and 12 are so close together and so perfectly formed with plane surfaces that no depressions occur which might pinch the tissues. The diameter of the part 10 is slightly less, however, at its middle point than at its ends so that a distinct but slight concave curvature is produced throughout the entire part 10.

The instrument shown in Figure 5 is merely a modification of that shown in the other figures. In this case there are two metal rods 15 each having a concave operative surface and terminating in a single handle member. These parts are held together but in spaced apart relation by means of closed straps 16. In order to adjust the parts 15 relative to each other, I employ set screws 17 passing through the straps 16 and having ball bearings 18 at their inner extremities as shown in Figure 6.

In order to remove the tumor or other obstructions the animal is first cast and one front leg is tied between the hind legs so that the teat or teats to be operated on are uppermost. The two rollers 10 are then placed on opposite sides of the teat and grasped in the hands, both hands being used. It is desirable that there be some milk in the canal between the rollers and the obstruction, and just sufficient pressure should be exerted by the hands to completely close the canal. By then rolling the pair of members to the end of the teat, the tumor or other obstruction is forced out. The instrument of the form shown in Figure 5 is used in a similar manner except that the pressure against the teat is the result of the adjustable screw pressure rather than that of the hand grip and the rolling movement is accomplished directly by the hands.

On cows that have large pear shaped teats with a false membrane or a spider in the bottom of the milk chamber, this instrument can be used with perfect success. The rollers should be applied well up on the udder with a supply of milk below them. The rolling of the rollers will thus burst the membrane. In the case of spiders, it may be necessary to apply the rollers at different angles and to roll several times but the instrument will be effective if it is properly used for removing any obstructions.

Having thus described my invention in such full, clear, and exact terms that its construction and operation will be readily understood by others skilled in the art to which it pertains, what I claim as new and desire to secure by Letters Patent of the United States is:

1. A veterinary instrument for removing teat tumors and the like, comprising a pair of rollers having axial reduced shanks extending from the opposite ends thereof, said rollers having longitudinally concave peripheral surfaces adapted to center the rollers against the opposite sides of the udder, and a handle portion rotatably mounted on each shank, the handle portions being of substantially the same diameter as that of the adjacent end of the adjacent roller and abutting the same to provide an uninterrupted continuation thereof, said handle portions adapted to be grasped in pairs in the hands of the user and squeezed toward each other to press the rollers against the opposite sides of the udder and over the teat to eject obstructions from the milk canal.

2. A veterinary instrument for removing teat tumors and the like, comprising a pair of relatively long small diameter rollers having registering longitudinally concave peripheral surfaces for registering the rollers against the opposite sides of the udder, and handle portions carried by the rollers and projecting from the opposite ends of the instrument whereby the handle portions may be grasped in the hands of the user for supporting the rollers for free rotation over the udder and teat, for shifting the rollers into parallel and nonparallel relation, and for varying at will the pressure of said rollers on the teat or udder.

In testimony whereof I affix my signature.

DARRELL E. TRUMP.